D. McFARLAND.
RAILROAD TRUCK.
No. 77,505. Patented May 5, 1868.
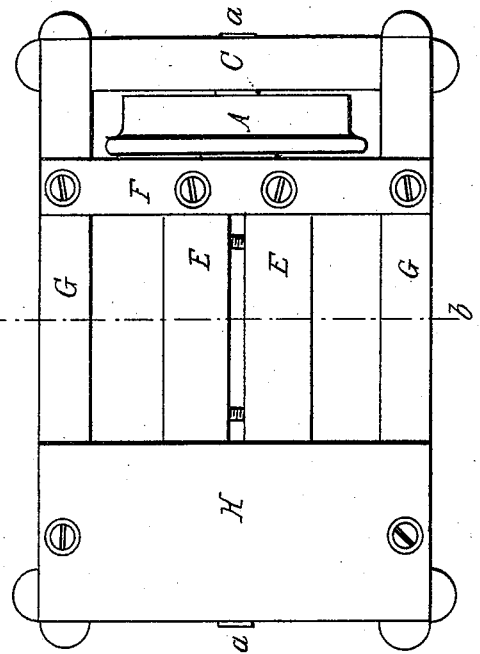
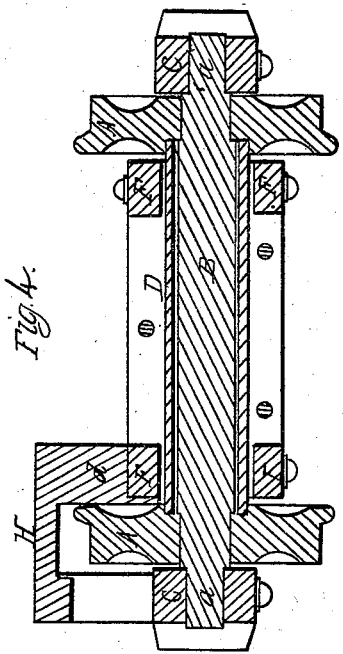
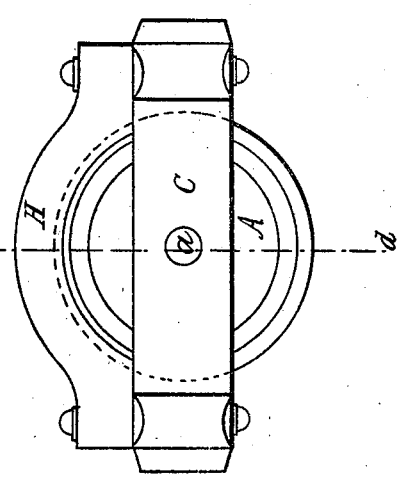
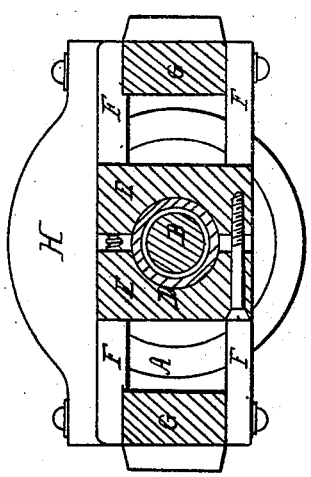
Witnesses:
Thos. H. Dodge
D. S. Miller
Inventor:
David McFarland

United States Patent Office

DAVID McFARLAND, OF WORCESTER, MASSACHUSETTS.

Letters Patent No. 77,505, dated May 5, 1868.

---

IMPROVEMENT IN RAILROAD-TRUCKS.

---

The Schedule referred to in these Letters Patent and making part of the same.

---

KNOW ALL MEN BY THESE PRESENTS:

That I, DAVID MCFARLAND, of the city and county of Worcester, and Commonwealth of Massachusetts, have invented certain new and useful Improvements in Railroad-Trucks; and I do hereby declare that the following is a full, clear, and exact description of the same, reference being had to the accompanying drawings, forming a part of this specification, in which—

Figure 1 represents an end view of a truck with one set of wheels, having my improvements applied thereto.

Figure 2 represents a top or plan view of the same.

Figure 3 represents a cross-section on line $a\ b$, fig. 2, and

Figure 4 represents a longitudinal central section on line $c\ d$, fig. 1.

To enable those skilled in the art to which my invention belongs to make and use the same, I will proceed to describe it more in detail.

In the drawings, the wheels A A are fastened to the axle B, the projecting ends $a\ a$ being turned to fit the boxes or bearings in the side supporting-pieces C C. A tube, D, is placed upon the axle B, before the wheels are fastened on, the ends of said tube in this instance entering recesses or grooves turned or formed in the hubs of the wheels A A, as fully indicated in the drawings. Tube D is supported in this instance by two clamping-pieces, E E, which are clamped or screwed together so as to hold said tube in a firm and secure manner, and free of the axle.

The clamping-pieces E E are fastened at their ends to the cross-pieces F, which in turn are fastened to the side-pieces G of the truck-frame.

H is a shield or wheel-cover, the ends of which rest upon and are supported by the truck side-pieces G. The inner side $d$ of the wheel-cover H rests upon one of the cross-pieces F.

From the foregoing description it will be observed that the axle B is guarded, so that if it breaks it cannot become displaced immediately, since the tube D will retain it in proper position until the train can be stopped.

Again, by the use of a wheel-cover or shield H, the car would not drop, even if the axle broke, since the wheel would be retained in an upright position by the end-piece C, and the cross-pieces F upon the inside of the wheel, while the shield would strike upon the top of the wheel, thereby supporting the body of the car, to give time for stopping the train.

The tube D may be supported from the truck-frame in any proper manner, by hangers or braces, or otherwise. I have shown one good mode of supporting it.

Should the axle B for any purpose be made in two pieces, the combination therewith of a tubular protector will add very much to the security and safety of the device.

By letting the ends of the tube project into the ends of the hubs of the wheels, they become supports to the car in case of the breaking of an axle, resting as they then would upon the hubs of the wheels for a support.

The hole in the part D may be made oblong, or otherwise, to give room for the axle while the car is in motion.

The clamping-pieces E E, even without the tube D, may be made to answer a good purpose, to prevent the deflection of the journal or axle in case of its breaking, although I prefer to use the tube D in combination with them. A wheel-shield or cover is to be applied to each wheel.

It is evident that my improvements may be carried out and applied in various ways without departing from the principle of my invention. I prefer to make the tube D of plate-iron.

Having described my improved railroad-truck, what I claim therein as new, and of my invention, and desire to secure by Letters Patent, is—

1. The combination, with the axle or journal of a set of car-wheels, of an axle-protector or guard, substantially as and for the purposes set forth.

2. The combination, with the axle of a set of car-wheels, of a tubular protector, for the purposes set forth.

3. The combination, with the axle of a set of car-wheels, of a guard-piece, E, or its equivalent, on each side of the journal or axle, for the purpose of preventing the deflection of the axle, in case of it breaking.

4. The combination, with the axle B and wheels A A, of the tube D, clamping-pieces E E, and cross supporting-pieces F F, substantially as and for the purposes set forth.

5. The combination, with the truck and wheels, of a wheel-protector, shield, or cover H, substantially as and for the purposes set forth.

DAVID McFARLAND.

Witnesses:
    THOS. H. DODGE,
    D. L. MILLER.